United States Patent

Shade et al.

[15] 3,697,891

[45] Oct. 10, 1972

[54] BIDIRECTIONAL WAVEFORM GENERATOR WITH SWITCHABLE INPUT

[72] Inventors: Ross A. Shade, Santa Ana; William H. Terbrack, Newport Beach, both of Calif.

[73] Assignee: J. D. Wrather, Jr.

[22] Filed: Dec. 31, 1970

[21] Appl. No.: 103,106

[52] U.S. Cl.........................332/9 T, 307/246, 330/9, 332/16 T, 332/18

[51] Int. Cl................................................H03c 3/08

[58] Field of Search.......332/9, 9 T, 16, 16 T, 14, 29, 332/19, 18; 307/246, 247, 247 A; 330/9, 10

[56] References Cited

UNITED STATES PATENTS

| | | | |
|---|---|---|---|
| 3,371,291 | 2/1968 | Forrest et al. | 332/9 R X |
| 3,441,877 | 4/1969 | Thompson | 332/9 R |
| 2,570,939 | 10/1951 | Goodrich | 332/29 R X |
| 3,227,395 | 10/1966 | Grindle et al. | 332/9 T |
| 3,207,998 | 9/1965 | Corney et al. | 330/9 X |
| 3,290,617 | 2/1966 | Bellem | 332/18 X |
| 3,497,830 | 2/1970 | Colton et al. | 332/9 R |

*Primary Examiner*—Alfred L. Brody
*Attorney*—Gausewitz, Carr & Rothenberg

[57] ABSTRACT

A reactive impedance connected to the input of a feedback amplifier is alternately charged through a switch from a positive and negative voltage reference source. A resistive summing network compares the output of the amplifier with the output of the switch and provides a feedback to toggle the switch back and forth between the two voltage sources. The outputs of both the amplifier and the switch cyclically change polarity to provide a bidirectional output waveform having a period that varies in accordance with variations of one or more of the impedances connected to the amplifier input or output. Either linear or non-linear variation of the period of either of the bidirectional outputs may be obtained by varying one of the resistors of the summing network or some combination of the several impedances of amplifier and summing network. Further, the period of the fluctuating bidirectional output from either the switch or amplifier may be made to undergo a change that is proportional to an analog input signal by providing a third resistive summing network input that is a linear function of an analog input to be modulated upon the output.

The circuits described are useful in a wide variety of systems and provide a number of different functions. They are particularly useful as time modulators in systems such as those described in a copending application for Data Handling System Employing Time Modulation, Ser. No. 861,785 filed Sept. 29, 1969, by J. P. LaBarber, Ross A. Shade, and William H. Terbrack, and assigned to the assignee of the present application.

12 Claims, 5 Drawing Figures

INVENTORS
ROSS A. SHADE
WILLIAM H. TERBRACK
BY Gausewitz, Carr & Rothenberg
ATTORNEYS INVENTORS
ROSS A. SHADE
WILLIAM H. TERBRACK
BY Gaunegity, Carr & Rothenberg
ATTORNEYS

BIDIRECTIONAL WAVEFORM GENERATOR WITH SWITCHABLE INPUT

BACKGROUND OF THE INVENTION

1. Field of the Invention

The present invention relates to waveform generators and more particularly concerns such a generator that is readily adaptable to a number of different modes of modulation.

2. Description of Prior Art

Bipolar waveform generators produce a continuous signal that repetitively fluctuates in sense or direction, even though the actual polarity may not change. A waveform having a repetitively reversing polarity is but a special case of such a bidirectional waveform. These waveforms are useful in many different arrangements for data handling, transmission, reception and sensing, being commonly employed to carry an information signal modulated thereon. Modulation techniques include amplitude or frequency modulation, several types of digital encoding such as pulse code modulation, pulse width modulation, and time modulation. An example of the application of such a bidirectional waveform generator is the time modulator described in detail in the above-mentioned copending application for Data Handling System Employing Time Modulation.

The modulator of the above-mentioned copending application, a form of an astable multivibrator, has the period or duration of each half cycle thereof modified in accordance with an information signal to be modulated upon the output waveform. Thus, the period of the cyclically fluctuating waveform is directly proportional to the modulating input signal.

Although the time modulator described in such copending application has performed satisfactorily, certain applications require improved accuracy, higher stability and greater reliability. Further, it is always desirable to obtain equal or improved results with less complex circuits and fewer components. The systems to be described herein will provide such time modulation, among other functions, without many of the above-mentioned disadvantages, by the use of repetitive charging of an energy storage circuit.

Waveform generators employing repetitively charged energy storage circuits, repetitively charged capacitors in particular, are widely known and have long been used in a variety of forms. Generally, in such circuits, a capacitor is charged through a resistor from a source of voltage until it attains a charge sufficient to trigger into conduction a switching device that is connected in shunt thereacross. Thus, the capacitor is discharged at least to the extent that the impedance of the switching device can fall to its lower value. Output frequency of a waveform derived from the capacitor is controllable by varying the charging resistance or other circuit impedances or in some instances by controlling the point at which the shunting switch can be triggered. In such arrangements, circuit operation depends upon the repeatability of the discharge of the capacitor and stability of voltage supplies. Stability, reliability, and freedom from drift may fail to meet stringent requirements in many situations. Further, such prior waveform generators employing energy storage devices do not provide the desired wide variety of modulation functions, including the time modulation function described in the aforementioned copending application.

SUMMARY OF THE INVENTION

A waveform generator for producing a bidirectional output employs an electrical energy storage device and a supply means for energizing the device with electrical energy. A comparator connected with the device generates a trigger signal when energy stored in the device attains a predetermined level relative to the supply means. The trigger signal is caused to change the electrical energy that is provided from the supply means to energize the storage device. The output waveform of the device may be modulated by varying one or more of the impedances forming part of the energy storage device, by varying the device itself, or by varying the effective reference that is provided to the comparator. Depending upon the method chosen, the output waveform may be made to vary as a complex function of an input modulating signal or the waveform may be caused to have a period that varies in proportion to an input modulating signal.

DETAILED DESCRIPTION

BASIC GENERATOR

Figure 1:
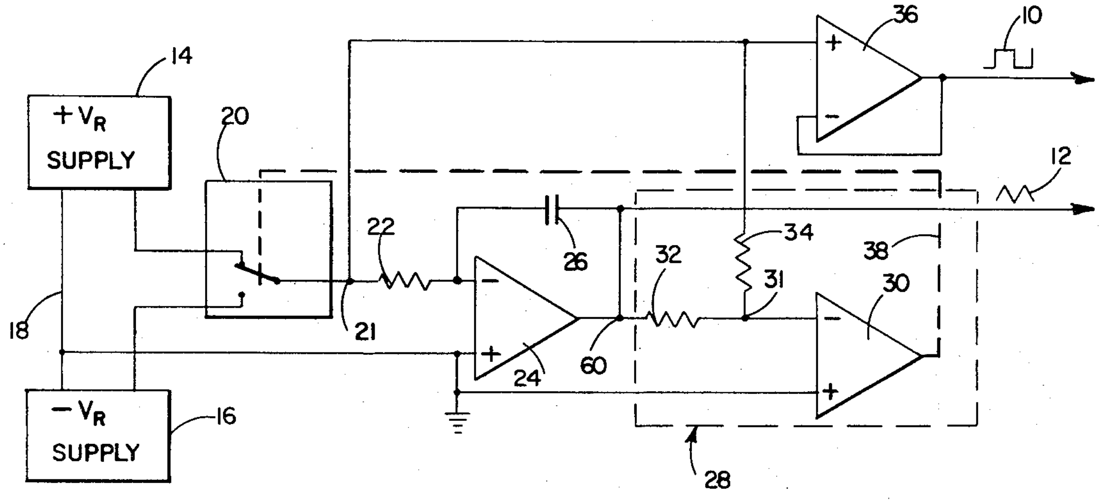
FIG. 1 is a block diagram of a bidirectional waveform generator constructed in accordance with principles of the present invention and employing an energy storage device that includes a capacitive impedance.

Illustrated in FIG. 1 is the block diagram of a basic generator of this invention that produces a continuous cyclically fluctuating bidirectional waveform. Such output waveform is either a square wave as indicated at 10 or a triangular waveform as illustrated at 12. Each of the waveforms has a period that is basically determined by the equation, $T=CV/i$, where $T$ is the total period of the waveform, $C$ is capacitance of a particular impedance, $V$ is the voltage deviation on the capacitor, and $i$ is charging current. In the illustrated circuit, the period is basically a function of three resistors and one capacitor and independent of the charging voltage source.

A pair of voltage sources 14, 16, providing voltages $+V_R$ and $-V_R$ of equal magnitude but opposite polarity are connected together via line 18 to provide a system ground substantially at the midpoint between the two opposite polarity voltages, namely zero volts in this arrangement. The voltage sources have the other sides thereof applied to first and second input terminals of a switch 20 that is operable between first and second states to alternately feed electrical energy from the two voltage sources to its output terminal 21 and to an input impedance in the form of resistor 22. The latter is connected to a first input terminal of a high gain differential amplifier 24 that has its second input connected to the system ground on line 18. Amplifier 24 is an integrating amplifier, an energy storage device, by virtue of a capacitor 26 connected between its output terminal 60 and its first input terminal.

Also connected to the output 60 of amplifier 24 is a comparator 28, that comprises a resistive summing network having an output 31 connected to one input of a second high gain differential amplifier 30 which has its other input connected to the system ground. The resistive summing network of the comparator of the basic waveform generator comprises a first impedance in the form of a resistor 32 connected to the output of amplifier 24 and a second impedance, resistor 34, connected between the summing network output and the output 21 of switch 20. The triangular wave output from the basic generator is derived from output 60 of amplifier 24 whereas the square wave output of the basic generator is provided at the output of a third isolation amplifier 36 that has an input from the output 21 of switch 20.

Amplifier 24 and capacitor 26 together with the other impedances connected thereto comprise an integrating circuit to which is fed current $I_i$ that is essentially the voltage at the output of switch 20 ($V_R$) divided by resistor 22. $I_i = V_R/B_{22}$. Because amplifier 24 is a high input impedance high gain amplifier and capacitor 26 is connected between the amplifier output and its inverting input, substantially all of the current flowing into resistor 22 from the switch 20 is caused to charge the capacitor. The amplifier acts to keep its inverting input terminal at a level substantially equal to its grounded input terminal as in the conventional integrating amplifier circuit. For any given state (position) of switch 20, the output of amplifier 24 provides a current in resistor 32 that is compared with the current in resistor 34 provided by the output of the switch 20. When the currents are such that the voltage at summing network output terminal 31 is zero, the output of high gain amplifier 30 rises sharply to produce a trigger signal indicated by dotted line 38 that operates switch 20 to toggle the switch to its other position or state.

Assuming that the apparatus had started in the illustrated position, switch 20, after being toggled is in a position to supply a negative-going charging current from source 16 to thereby charge capacitor 26 in the opposite direction. Again, as in the first charging direction, the output of amplifier 24 reflects the charge on the capacitor at any given instant and provides a first input to the resistive summing network. The second input to the resisting summing network is a reference provided by the output of switch 20. This is the value of negative voltage source 16 when switch 20 has been toggled from its illustrated position. Now, with source 16 providing the charging energy, when the output of amplifier 24 and the charge stored in capacitor 26 attain a level having a selected relation to the voltage of this source, the comparator amplifier output rises sharply and switch 20 is once again toggled to temporarily rest in the illustrated position thereof. This alternate charging of the capacitor 26 from the two different sources and the toggling of the switch 20 by operation of comparator 28 is continuously repetitive and self-sustaining to provide the indicated output waveforms 10 and 12.

It will be noted that the described circuit is of greatly improved stability particularly in that its triggering point is independent of fluctuations in voltage of the two voltage sources 14, 16. This is so because the point of triggering is sensed by comparator 28 in relation to a reference that is the charging voltage itself. Should the voltage sources drop in value by 1 percent, for example, the charging voltage to the capacitor will drop by 1 percent, whereby the rate of charge of the capacitor likewise decreases. Thus, the capacitor will take a longer time to attain any predetermined fixed or absolute charge value. However, it is not any fixed or absolute charge value that is caused to toggle the switch 20 and thus terminate a given half cycle, but rather the relation between such capacitor charge and a reference which is the charging voltage itself. Thus, even though the rate of charge of the capacitor has decreased, so too has the level of the reference to which the attained charge is compared. Accordingly, the increased charging time of the capacitor is precisely compensated by the decreased reference level of the comparator, and the waveform period remains unchanged.

INDUCTIVE GENERATOR

Figure 2:
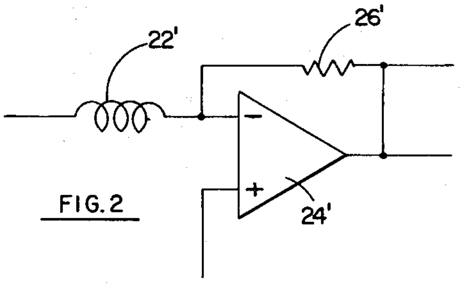
FIG. 2 illustrates a modification of the generator of FIG. 1, employing energy storage having an inductive impedance.

Illustrated in FIG. 2 is a modification of FIG. 1 wherein electrical energy storage is provided by an arrangement including an inductive impedance instead of a capacitive impedance. In this arrangement, amplifier 24' is substantially identical to amplifier 24 of FIG. 1 and is connected to external circuitry in a similar manner. However, in the place of a feedback capacitor, there is provided a feedback resistor 26' connected between the amplifier output and its inverting input. Further, in the place of the resistive impedance 22, there is provided an inductive impedance 22' connected between the inverting input of amplifier 24' and the output terminal 21 of the switch such as switch 20 (not shown in this figure).

This circuit will operate in much the same manner as the circuit of FIG. 1. The output of amplifier 24' will rise when the switch 20 is toggled. The rise in this output will occur at a rate determined by the magnitude of the charging potential and the values of inductance 22' and resistor 26'. When this energy storage device attains a predetermined level of energy storage as indicated by the amplifier output, a resistive summing network of a comparator identical to that shown in FIG. 1 will sense a predetermined relation between the amplifier output and the energizing or reference voltage provided at the switch output. The comparator provides a signal to toggle the switch whereby the polarity of the energizing current flowing through the circuit is reversed. Further details of the operation of this embodiment are set forth below.

CIRCUIT DETAILS

Figure 3:
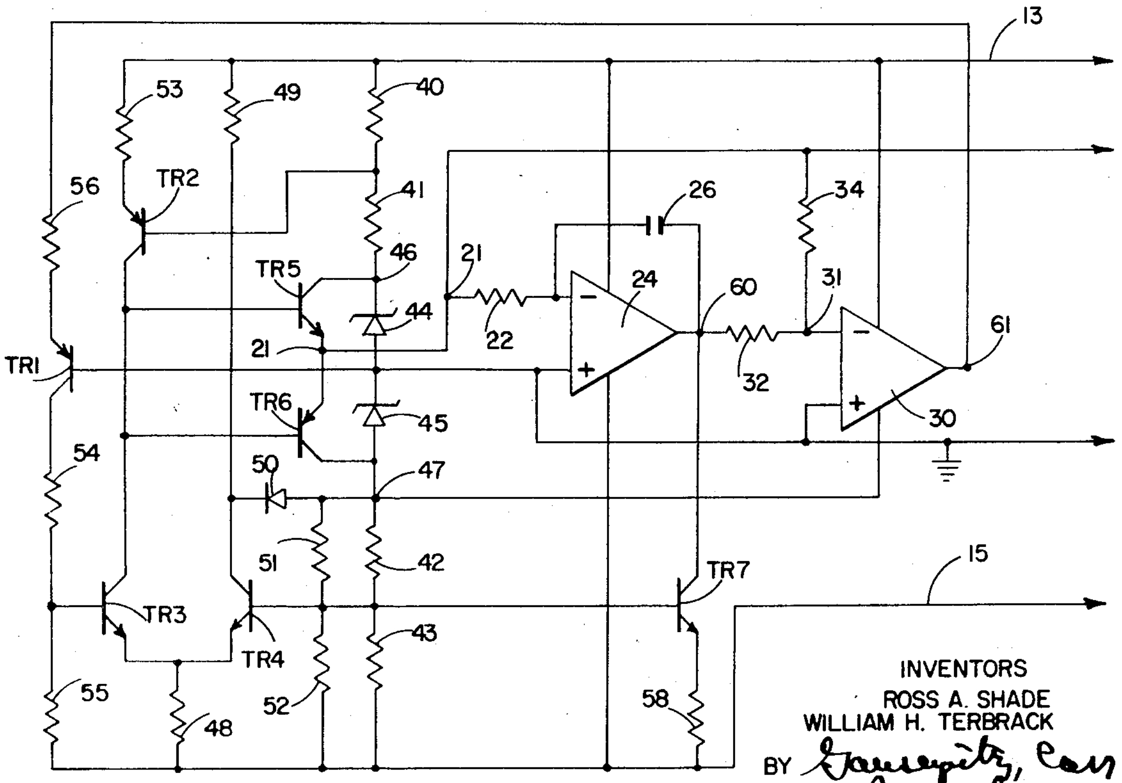
FIG. 3 comprises a detailed circuit diagram of the system of FIG. 1.

Illustrated in FIG. 3 are details of the circuit of the system of FIG. 1 including an exemplary embodiment of switch 20 and its connections to voltage sources. In this diagram, amplifier 24, capacitor 26, amplifier input resistor 22, resistive summing network resistors 32, 34, and comparator amplifier 30, are all connected and arranged in the manner described in connection with the block diagram of FIG. 1. The voltages are provided via first line 13 from a plus 12 volts D.C. source, for example, and a second line 15 from a negative 12 volts D.C. source. The several reference voltages and connections are picked off from a voltage divider connected across lines 13, 15, and formed by resistors 40, 41, 42, and 43. Connected in series with each other and in series between resistors 41 and 42 as part of the voltage divider is a pair of zener diodes 44, 45. With the exemplary voltage level indicated, the component values are so chosen that the junction of the two zener diodes is zero volts, system ground.

Point 46 at the junction of diode 44 and resistor 41 is at plus 6 volts and point 47 at the junction of zener diode 45 and resistor 42 is at minus 6 volts.

Switch 20 of FIG. 1 is formed by a pair of complementary type transistors TR 5 and TR 6 having their emitters connected in common at point 21 as the switch output. This point provides an input to resistor 22 and a reference for the resistive summing network of the comparator. The collectors of switching transistors TR 5 and TR 6 are connected respectively to the voltage divider at points 46 and 47, the plus 6 and minus 6 volt points, respectively. The bases of transistors TR 5 and TR 6 are connected in common to the collector of a switch driving transistor TR 3. TR 3 and a second driving transistor TR 4 have their emitters connected in common to the negative 12 volt supply via a resistor 48. The collector of TR 4 is connected to the plus 12 volt supply via resistor 49 and the transistor is biased by a diode 50 and a pair of resistors 51, 52, connected to the collector and base of the transistor and to the negative voltage source as indicated. The collector of TR 3 is connected with the collector of a driving transistor TR 2 having its base connected to the junction of resistors 40, 41, and its emitter connected to the positive supply through a resistor 53.

A toggling transistor TR 1 has its collector connected to a pair of voltage dividing resistors 54, 55, of which the junction is connected to the base of TR 3. The emitter of toggling transistor TR 1 is connected via a resistor 56 to the output terminal 61 of comparator amplifier 30. This closes the switch operating feedback loop.

A transistor TR 7 has its base connected to the junction of resistors 42, 43, its emitter connected through a resistor 58 to the negative 12 volt source and its collector connected to the output of amplifier 24. Voltage supply and biasing circuits for the several amplifiers are provided by conventional circuits.

OPERATION OF THE CIRCUIT OF FIG. 3

When power is first applied to the circuit of FIG. 3, the initial charge across capacitor 26 is zero volts. The voltages of amplifiers 24 and 30 at output terminals 60 and 61, respectively, are zero volts, transistors TR 1 and TR 3 are non-conducting, and TR 4 conducts. The collector voltage on TR 3 begins to rise by means of current flowing from the collector of TR 2. The current in TR 2 is determined by the base current provided from the voltage divider and the magnitude of the emitter resistor 53. As the collector of TR 3 rises, the base of NPN transistor TR 5 also rises and this rise continues until TR 5 reaches saturation. This same rise in the collector of TR 3 helps suppress conduction of PNP transistor TR 6, the other of the switching transistors. With TR 5 conducting at saturation, its emitter is held substantially at the 6.0 voltage level on the upper side of zener diode 44.

The commonly connected emitters of TR 5 and TR 6 provide the switch output or reference voltage to which is clamped one side of each of resistors 22 and 34. The other side of resistor 22 is connected to the inverting input of amplifier 24 whereby positive current flowing in resistor 22 tends to lower the potential at point 60 at the output of this inverting amplifier. As previously indicated, the other input of this differential amplifier is clamped to ground. The potential at point 60 begins to drop at a rate determined by the current flowing in the resistor and the value of capacitor 26. The change in voltage per unit of time across the capacitor 26 is equal to the charging current, the current flowing in resistor 22 divided by the value of the capacitor.

The current flowing through resistor 22 is constant because saturation of TR 5 clamps one side of resistor 22 to a fixed voltage level and the inverting input of high gain amplifier 22 is held at a value very close to the ground connection to its non-inverting input by means of the normal action of this feedback amplifier. With a fixed voltage at the switch output terminal 21 and a constant current, the output of the amplifier at point 60 falls at a constant rate.

In a particular example, resistor 32 is made equal to resistor 34. Under this condition, the output of amplifier 24 continues to fall until the voltage at point 60 is equal to the voltage at point 21. With equality between the voltage at these points, a first triggering point is reached. The voltage at point 31, the output of the resistive summing network becomes zero volts which causes a sharp rise in the output of amplifier 30. Amplifier 30 is of high gain and the magnitude of its output is internally limited so that its output experiences a sharp but limited magnitude rise when its input falls to zero.

Until the point of triggering of amplifier 30 had been reached, point 31 was above zero volts whereby the output of the amplifier is low. When the zero volt triggering point at its input is reached, its output rises, the switch is operated and point 21 becomes a negative 6 volts as will be presently described. Thus, during the ensuing half cycle (when point 21 is negative), the output of amplifier 30 remains high to maintain switch 20 in its second state, wherein TR 5 is cut off and TR 6 is saturated.

Returning to description of the startup, when the first triggering point is reached and the output of high gain amplifier 30 rises, there is a large voltage drop across the resistor 56 at the emitter of TR 1 which turns on this transistor whereby its collector voltage rises to cause an increased voltage drop across the series resistors 54 and 55. As the voltage at the junction of these resistors rises to a point where the base voltage of TR 3 exceeds the base voltage of TR 4, as established by resistors 51 and 52, TR 3 turns on to switch current from he previously conducting TR 4 through the now conducting TR 3 through the common emitter resistor 48. The component values are chosen such that current in TR 3, when the latter conducts, is at least twice the current in the collector of conducting TR 2. Accordingly, the voltage at the collectors of these transistors decreases rapidly to turn off switching transistor TR 5 and turn on switching transistor TR 6. The collector voltage of TR 3 continues to fall until the emitter of TR 6, point 21, is substantially at the value of its collector, which is negative 6 volts in the exemplary circuit.

The switch is now in its second state, resistors 22 and 34, are clamped to the negative 6 volt potential (of equal magnitude but opposite polarity with respect to the potential at which they are clamped when TR 5 is saturated), the current in resistor 22 is in the reverse direction and capacitor 26 charges (or discharges) in the reverse direction. The circuit has now reached a point at which it commences its steady-state continuously fluctuating operation. A first complete half cycle has commenced with switch 20 in its negative voltage source state, TR 5 cut off and TR 6 saturated. The switch will remain in this condition and is held therein as long as TR 3 remains in conduction. The latter will continue to conduct as long as the output of amplifier 30 remains high to keep TR 1 in conduction.

As the first half of the first complete cycle commences with TR 6 conducting, capacitor 26 charges linearly toward the negative 6 volt reference. The output of amplifier 24 (starting at a value equal to the negative reference) rises for the time required for capacitor 26 to change its charge value by an amount equal to the absolute sum of the positive and negative voltage sources. For the special case where the resistors 32 and 34 are equal and the two voltage sources are of equal magnitude and opposite polarity, the change in voltage across the capacitor is twice the magnitude of either one of the voltage sources, 12 volts with the exemplary values illustrated in FIG. 3. When the capacitor voltage has changed by such amount, the voltage at the amplifier output has attained a value equal and opposite to the voltage at point 21 during this half cycle, wherefore, the voltage at point 31, the output of resistive summing network, is once again zero.

It will be noted that upon commencement of the first half of the first complete cycle, point 21 was switched to the negative 6 volt reference source by saturation of switching transistor TR 6 and the output of amplifier 24 was still low as the capacitor began its reverse charge. Accordingly, point 31 was low and gradually rises with the rise in voltage at point 60, the output of amplifier 24. As long as point 31 is below zero volts, the output of comparator amplifier 30 remains high to continue TR 1 in conduction and, accordingly, to maintain the switch in the state in which TR 6 is saturated.

When point 31 reaches zero volts, the comparator output drops to signal the end of the first half cycle. TR 1 and TR 3 no longer conduct, and the base connections of both switching transistors TR 5 and TR 6 rise rapidly to toggle the switch to its other state. For the assumed conditions of equal magnitude and opposite polarity of points 46 and 47, the two voltage reference sources, it can be shown that the period $T_1$ of the first half of one complete cycle is equal to $R_1 C_1 \times 2R_2/R_3$, where $R_1$ is resistor 22, $C_1$ is capacitor 26, $R_2$ is resistor 32, and $R_3$ is resistor 34. From analysis of the above relation, it will be seen that the value of the reference voltages, the potentials at points 46 and 47, is not a factor that determines the period. Thus, the absolute value of the reference voltage is immaterial. Drift or variation therein will have to effect upon the period of the output waveform or upon the duration of this half cycle.

As earlier indicated, the first half cycle is terminated when the voltage at point 60, the output of amplifier 24, has reached a value equal and opposite to the reference voltage at the switch output point 21, whereby the resistive summing network output 31 is again zero volts. The output of amplifier 30 drops sharply turning off TR 1, TR 3 and TR 6, and turning on TR 5. The switch output terminal point 21 and one side of each resistor 22, and 34 are once again clamped to the positive reference source, the plus 6 volts at point 46. The current in resistor 22 again reverses and the second half of the first complete cycle is initiated. Capacitor 26 again charges linearly for the time required for the change of voltage across the capacitor to reach a value of $2V_R R_2/R_3$, a value of twice the magnitude of either potential source where resistors 32 and 34 are equal and where the positive and negative potential sources are equal.

It can be shown that the duration $T_2$ of this second half of the first complete cycle is equal to $R_1 C_1 2R_2/R_3$ where the quantities refer to the impedances identified above. Accordingly, the total time $T_t$ for one complete cycle, the total time for one full period of the continuous cyclic steady-state operation of the device, is equal to $T_1$ plus $T_2$ which is equal to $4 R_1 C_1 R_2/R_3$.

Since the second half cycle, like the first half cycle, has a period that is independent of the absolute value of the voltage reference sources, it will be seen that the total period of the steady-state continuous waveform is not subject to drift or fluctuation of the voltage reference.

A precisely symmetrical triangular waveform is produced at point 60, the output of amplifier 24. A precisely symmetrical square wave output is produced at the output of the switch, at point 21. It is this square wave output 21 which is most conveniently employed where the generator is used as a time modulator in the system of the above-identified copending application.

For equal absolute values of the voltage references, the positive and negative-going slopes of both half cycles of the triangular waveform at point 60 are equal. The waveform symmetry is independent of component values.

Transistor TR 7 operates to provide a constant current load for the output of amplifier 24. Current drawn by TR 7 is greater than the current drawn from the amplifier output by the other components connected thereto. Accordingly, the total output current of the amplifier does not reverse (although its output voltage swings between the values of the two reference sources). Certain undesirable internal transients attendant upon current reversal are thereby avoided.

WAVEFORM VARIATION

The above-described circuit may be employed to provide a continuous bidirectional waveform of high reliability and great stability without any further addition or modification. Nevertheless, it is also capable of functioning to impose a variation or modulation upon its triangular waveform at point 60 by selectively varying different ones or combinations of the several impedances that are coupled with amplifier 24 or comparator 28. These impedances may be varied either manually or automatically. The variable impedance may be provided in the form of a condition sensitive transducer such as a pressure responsive capacitor, a thermistor, a potentiometer, or a strain gage resistor, for example.

From the basic equation for the period of the output of this waveform generator, $T = 4R_1 C_1 R_2/R_3$, it will be seen that true proportional time modulation, that is, an output period that varies proportionally in accord with a modulating input, may be obtained by varying the value of any one of $R_1$ (resistor 22), $R_2$ (resistor 32), or $C_1$ (capacitor 26), in such a fashion that its resistance or capacitance value is directly related to an input condition that is to be modulated upon the output waveform.

Further, by varying any desired combination of $R_1$ $C_1$ and $R_2$ simultaneously, the output period, T, will vary as the product of the several variations. In this fashion, the output period provides a multiplication in the time domain.

Still further, the output period may be made to vary in inverse proportion to an input where the value of $R_3$ (resistor 34) is made to vary in proportion to such input. Thus, the circuit will provide an output frequency, rather than an output period proportional to the modulating input.

It will be seen that a constant value for two of the component values in the numerator of the above-identified relation may be selected and the third component of the numerator may be varied in conjunction with the denominator, the latter two being considered as independent variables, whereby the output period, T, will vary as the quotient of the two independent variables. For example, if $R_1$ and $C_1$ are of fixed value and $R_2$ and $R_3$ are made to vary, the output period of the waveform will be directly proportional to the quotient $R_2/R_3$. Of course, other combinations of variation of these several impedances may be selected as desired to provide a variety of mathematical operations on the several variables.

The operation of the bidirectional waveform generator when the impedances are modified as illustrated in FIG. 2 to provide an inductor at the amplifier input and a resistor connected between input and output of the amplifier is substantially the same as that described in connection with FIG. 3. The output waveform may be varied in accordance with any one or selected combinations of the several impedances, 22', 26', or the impedances of the resistive summing network 32, 34. Conveniently, the inductor 22' may be an inductive transducer such as a movable armature in a magnetic coil that is moved in accordance with a position or distance to be sensed, or it may be some other type of moving coil device. The combination of resistor 26' and inductor 22' act as energy storage devices in connection with amplifier 24'. Upon toggling of switch 20, current in inductor 22' will increase slowly. Initially a maximum voltage exists across the inductor. As current starts to flow through the inductor and increases in magnitude, there is an increasing voltage drop across resistor 26'. The current rises linearly with time as a function of the magnitude of the inductance. This change in current through inductor 22' is reflected as a change in the output of the amplifier 24'. As previously described in connection with the embodiment of FIG. 3, when the output of the amplifier 24' reaches a predetermined relation with respect to the reference voltage provided at the switch output (as sensed by the comparator) the switch is toggled. Thus, it will be seen that the operation of circuit of FIG. 2 is essentially similar to the operation of the circuit of FIG. 3 and like that circuit, is independent of absolute magnitude of reference voltages applied.

ALTERNATE MODULATION METHOD

As described above, the output waveform of the disclosed generator circuit may be varied or modulated in a number of different modes to provide a number of different output functions by directly varying one or a selected combination of the identified impedances. Even greater flexibility and other modulating functions may be obtained by a modulating arrangement exemplified by the block diagram of FIG. 4. Fundamentally, such modulating arrangement provides an input modulating function as a third input to the comparator. In the system illustrated in FIG. 4, the several components that function in the same manner as analogous components of the system of FIGS. 1 and 3 are identified by the same reference numerals. Thus, voltage sources 14, 16, switch 20, impedances 22, 26, 32, 34, amplifier 24, and comparator amplifier 30, together with the interconnections therebetween, are all identical to the like elements of FIGS. 1 and 3. However, the resistive summing network that provides an input to comparator amplifier 30, has a third input resistor 70. This provides at the summing network output, point 31', an output that represents the algebraic sum of currents fed through resistors 32, 34, and 70 from the potentials at the input sides of the several resistors. From another point of view, the output voltage at point 31' represents the algebraic sum of the voltages provided to the input sides of resistors 32, 34, 70. In effect, the provision of a modulating input signal via resistor 70 varies the reference (primarily provided via resistor 34) to which the output of amplifier 24 is compared in the comparator. Other than this effective variation of comparator reference in accordance with a modulating input, the circuit operates in exactly the same way. When the summing network output terminal 31' reaches zero volts, comparator amplifier 30 provides a trigger signal to toggle the switch 20 and thereby reverse the reference voltage and charging current through resistor 22 to the capacitor 26.

Figure 4:
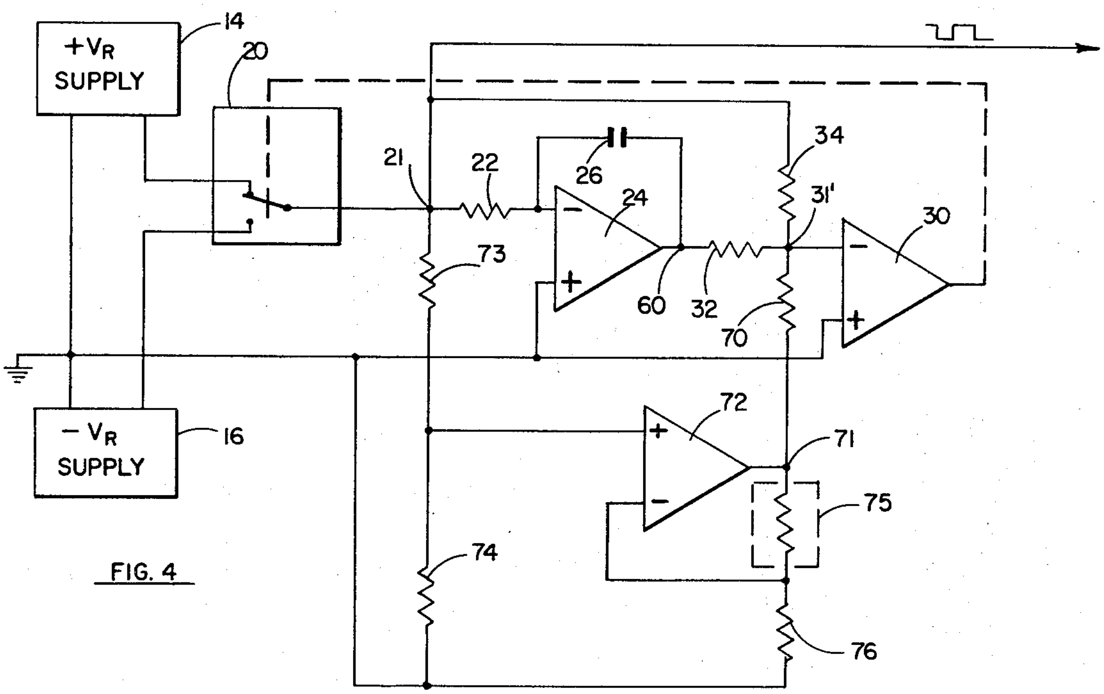
FIG. 4 illustrates an arrangement for modulating the output waveform of the system of FIG. 1 in accordance with the output of a transducer.

It is significant for the modulating arrangement of FIG. 4, where the modulating input signal is provided as a third input to the comparator, that such third input be switched in synchronism with the operation of switch 20. Such synchronous operation may be exactly in phase (0° phase relation) or exactly out of phase (180° phase relation). To this end, the modulating input is provided at the output terminal 71 of a third high gain differential amplifier 72 that has its non-inverting input connected to the junction of a voltage divider formed of resistors 73, 74, that are connected between the switch output terminal 21 and ground, respectively. Gain of amplifier 72 is controlled by voltage divider network formed of resistors 75, 76, connected between the amplifier output and ground, respectively. The junction of these resistors is connected as a feedback to the inverting input of the amplifier.

In operation of the circuit described in FIG. 4, gain of amplifier 72 is modulated or varied in accordance with an information signal input that is to be modulated upon the output waveform of the basic generator circuit. It will be seen that the gain of amplifier 72 is controlled by the relation of resistor 75 to resistor 76. Accordingly, variation of either of these may be provided as the information or modulating input. For purposes of exposition, resistor 75 is shown as comprising a transducer having a varying resistance such as a thermistor or strain-sensitive resistor, or the like. It will be readily appreciated that many other condition-responsive devices and a variety of arrangements for varying the gain of amplifier 72 or controllably varying the third input to the resistive summing network 32, 34, 70, may be employed.

Although the magnitude of the output of amplifier 72 at point 71 is proportional to the input modulating signal, namely the magnitude of the resistance of transducer 75 in this example, the polarity of the signal at point 71 is switched in synchronism (and in phase, in this example) with operation of switch 20. Thus, when the switch 20 is in a state to provide a positive voltage at point 21, the non-inverting input of amplifier 72 is also positive, whereby the amplifier output is likewise positive. When switch 20 is in its other state to provide a negative potential at point 21, the non-inverting input of amplifier 72 is likewise negative, to thereby provide at amplifier output terminal 71 a negative modulating signal. Thus, when the reference voltage provided via resistor 34 is positive, the effective reference, with which the signal provided from amplifier 24 is compared, is increased by the positive input via resistor 70 from point 71. Similarly, when the reference potential at point 21 is negative, the magnitude of the modified reference, with which the signal at the output of amplifier 24 is compared, is also increased in magnitude by the now negative modulating input provided from point 71 via resistor 70. Thus with the indicated phasing, the modulating input, in effect, increases the magnitude of the reference with which the output of amplifier 24 is compared. Thus, this achieves a net increase in the period of the output waveform for any given value of resistance of transducer 75. As such resistance increases or decreases, the net period of the output waveform will likewise increase or decrease. Obviously, the circuit may be operated with opposite phasing of the non-inverting input of amplifier 72, relative to the phasing of switch 20.

It can be shown that the total output period of the wave form produced by the generator of FIG. 4, that is, the time for one complete cycle, is as follows:

$$T_t = 4R_1C_1\left[\frac{R_2}{R_3}+\frac{R_2}{R_4}\cdot\frac{R_6}{R_5+R_6}+\frac{R_2}{R_4}\cdot\frac{R_6}{R_5+R_6}\cdot\frac{R_x}{R_7}\right]$$

where $R_5$ and $R_6$ are resistor 73 and 74, $R_7$ is resistor 76, $R_4$ is resistor 70, and $R_x$ is resistor 75. The other symbols are as previously identified. From inspection of this equation, it will be seen that a change in the output period is directly proportional to the input information signal, namely, the value of resistor 75.

A significant feature of the circuit of FIG. 4 is apparent from analysis of the above-identified relation governing the output period. The output waveform period is insensitive to fluctuations of voltage levels applied to the various circuits or amplifiers, and, accordingly, the output is insensitive to D.C. drift of the amplifier. Thus, a modulation circuit of extreme stability is provided.

FIG. 5 EMBODIMENT

Figure 5:
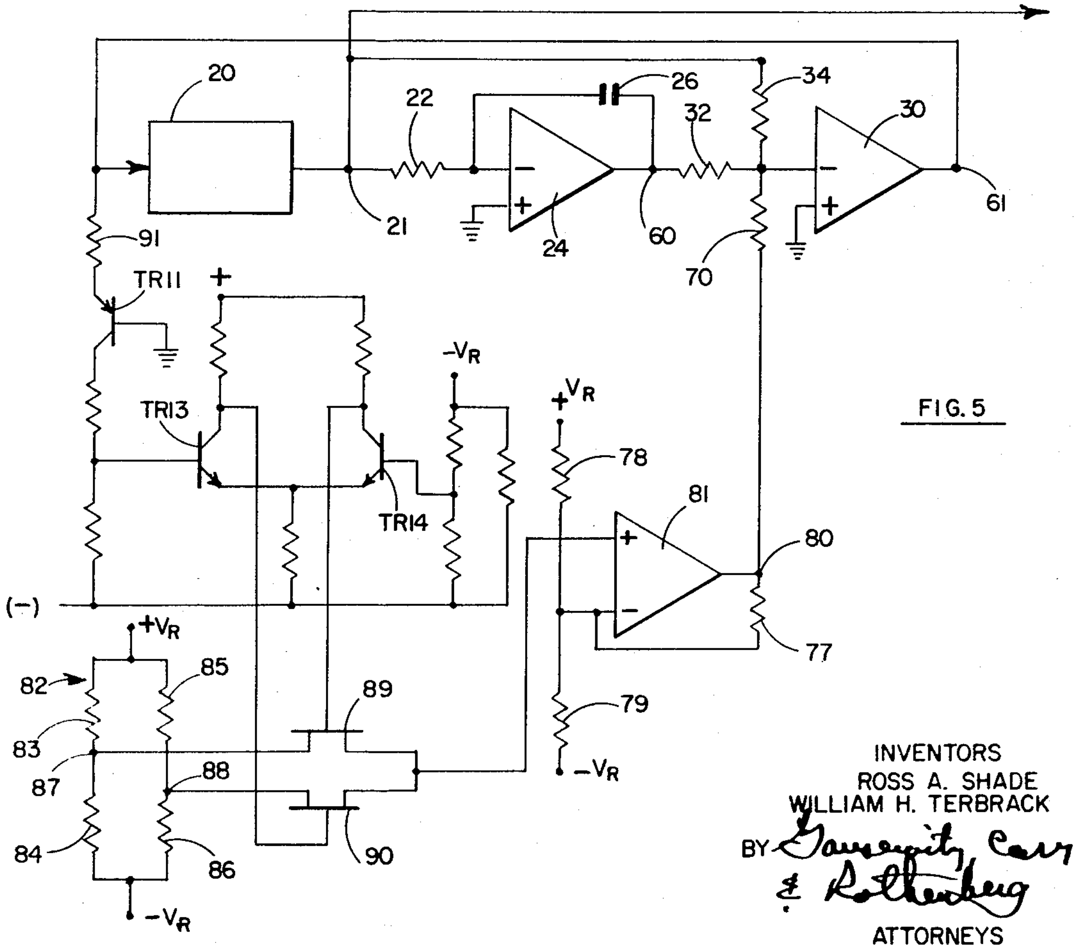
FIG. 5 illustrates a circuit for modulating the output waveform of the system of FIG. 1 in accordance with the output of a bridge circuit.

Illustrated in FIG. 5 is still another of many different types of arrangements for introducing a modulating input as a third input to the resistive summing network of the comparator. In this arrangement, switch 20, resistor 22, amplifier 24, capacitor 26, resistors 32, 34, and comparator amplifier 30, are all the same as and are all connected in the same manner as are the like identified components of the circuit of FIGS. 1 and 3. In this arrangement, as in the arrangement of FIG. 4, the resistive summing network of the comparator has a third input resistor 70, functionally identical to resistor 70 of FIG. 4, that receives an information signal input to be modulated upon the output waveform. The modulation signal is provided at the output 80 of a high gain differential amplifier 81. The non-inverting input of the amplifier 81 is connected via resistors 78, 79 to the plus and minus voltage sources $+V_R$ and $-V_R$ which are the +6 and −6 volt sources of FIG. 3, for example.

In this modulating input arrangement, the information input is provided by a condition sensing bridge circuit 82 having energizing terminals connected to $+V_R$ and $-V_R$, respectively, and having resistive legs 83, 84 and 85, 86 which collectively form a conventional bridge transducer. Bridge output terminals 87, 88, are respectively connected to the source electrodes of a pair of field effect transistors 89, 90, respectively. The drain electrodes of the field effect transistors 89, 90 are connected together and to the non-inverting input of the high gain amplifier 81.

Transistors 89, 90 are connected to operate as a pair of alternatively conducting switching transistors directly analogous to switching transistors TR 5 and TR 6 of FIG. 3. Like the latter transistors, transistors 89 and 90 are operated by connections of the gate electrodes thereof to the collectors of a pair of switch driving transistors TR 14 and TR 13. The latter may be identical to and connected in a manner just like the switch driving transistors TR 4 and TR 3, respectively, of the circuit of FIG. 3. TR 13, analogous to transistor TR 3 is biased directly from a 12 volt source through a resistor connected to its collector. The emitters of switch-driving transistors TR 13 and TR 14 are connected together and to a negative 12 volt source through a common resistor. The base of TR 13 is connected to be driven by a triggering transistor TR 11 that is analogous to TR 1 of FIG. 3. TR 11 is connected via a resistor 91 to the output terminal 61 of comparator amplifier 30. Thus, the switch 89, 90, together with its switch-driving transistors, is connected to be driven in parallel with the switch 20 and its drivers. The two switches are driven simultaneously by the output of comparator amplifier 30. When the output of amplifier 30 is high, TR 11, like TR 1, conducts to cause TR 13, like TR 3, to conduct, whereby transistor 90, like TR 6, conducts. When the output of comparator amplifier 30 is low, TR 11, like TR 1 is off, TR 3 and TR 13 are off, and TR 5 and field effect transistor 89 conduct.

In the circuit of FIG. 5, resistor 78 and 79, are preferably equal to provide a precisely centered voltage to the inverting input of amplifier 81. The combination of these resistors, together with the feedback resistor 77, determines the gain of amplifier 81.

As switch 20 is toggled, and in synchronism therewith, the modulating switch formed by field effect transistors 89, 90, also is toggled. This alternately feeds the bridge outputs at terminals 87 and 88 to the non-inverting amplifier input.

Since the effect of the modulating signal, as provided via the comparator resistor 70 is achieved only at the instant of switching, or just prior thereto, it will be seen that the output waveform is responsive only to the peak to peak representations of the bridge output. In this arrangement, just as in the arrangement of FIG. 4, the modulating amplifier 81 or its counterpart amplifier 72 of FIG. 4 are provided with sufficient time to settle. In other words, because these amplifiers have the inputs thereto switched in polarity and because certain delays are inherent in the amplifier circuitry, each time that the amplifier is switched its output will require a finite time to attain the value commanded by its input. During such delay or rise time of the output of the modulating amplifiers 72, 81, these outputs have no affect upon the circuit. This is so because the modulating inputs are effective only when the several values compared by the summing network are all at the triggering point. In particular, where the amplifier 24 has a capacitive feedback, the output of this amplifier will take a greater time to attain a value at or near the value at which switching will occur. Accordingly, the inherent delays of modulating amplifiers 81 and 72 are of no consequence since such delays are considerably shorter than the time required for the action of amplifier 24.

With the arrangement illustrated in FIG. 5, the period of the output waveform of the generator, the waveform produced at point 21 will change in direct proportion to the output of bridge 82. In this circuit the bridge may be replaced by a pair of differential voltages. Such differential voltages may be fed to points 87, 88, the respective source electrodes of the field effect transistors, whereby the change in output period of the modulated waveform will be proportional to the difference in such voltages.

As in the arrangement of FIG. 4, modulating switchs 89 and 90 must be operated in synchronism with the operation of switch 20, although they may be either in phase or directly out of phase. The phasing of switch 89, 90, with respect to the phasing of switch 20, will determine the sense of the modulation of the output period. So, too, the phasing of the modulating switch 89, 90, with respect to the sense of the difference between input voltages at points 87, 88, will determine the sense of the change in output waveform. If the voltages 87, 88 are equal, there is no modulation and no change in the period. This would provide merely a change in the D.C. component of the output of modulation amplifier 81. Further, with the arrangement of FIG. 5, a differential voltage at input terminals 87, 88, is not required for a modulating input. Either one of these terminals may be held at a fixed potential and the other varied to provide a modulating input.

The modulating switch 89, 90 may have the input thereto in the form of a single voltage, replacing the input provided by bridge 82 of FIG. 5. In such an arrangement, one of the modulating switch inputs such as the source electrode of transistor 90, for example, may be tied to ground, and the unknown voltage applied to the source electrode of the other of these field effect transistors. The output of modulating amplifier 81 then would provide an output proportional to the unknown voltage at the input of transistor 89 to thereby modulate the output waveform period accordingly.

In the embodiments of both FIG. 4 and FIG. 5 the several components and values are arranged so that comparator operation is much more affected by the current provided via resistor 34 than by the current via resistor 70. It is contemplated that a modulation of up to 50 percent will be available in normal operation. In other words, a modulating input at full scale will change the output period by plus or minus one-half of its nominal duration.

It will be seen that there have been described several arrangements of a bidirectional waveform generating circuit that provide an output of high reliability and extreme stability. In particular, the output is insensitive to fluctuation of voltage sources in that the potential employed to charge its energy storage device is also employed as a reference to determine a switching point in the circuit operation. Various types of modulating inputs have been described including several that are switched in synchronism with the switching of the basic waveform to provide a change in output period that is directly proportional to a modulating input.

The foregoing detailed description is to be clearly understood as given by way of illustration and example only, the spirit and scope of this invention being limited solely by the appended claims.

We claim:

1. A bidirectional waveform generator comprising
first and second voltage sources,
electrical energy storage means,
switch means for energizing said storage means from said first or second voltage sources alternatively,
comparator means for comparing the energy stored in said storage means with that one of said voltage sources from which the storage means is energized at a given instant,
means responsive to said comparator means for operating said switch means,
whereby said switch means is cyclically operated between said first and second voltage sources and said storage means is cyclically energized from said voltage sources
in alternation,
modulating means for varying at least one of said storage or comparator means to vary duration of the period of said cyclic switch operation,
said storage means comprising
an amplifier,
a first impedance connected between an input of the amplifier and said switch means, and
a second impedance connected between the output of said amplifier and said input thereof,
said comparator means comprising a network of impedances including impedances connected to the output of said amplifier and to the output of said switch means,
said modulating means comprising
a second amplifier having an input from the output of said switch means,
means responsive to an information signal to be modulated upon the waveform of said generator for modulating the gain of said second amplifier, and means for feeding the output of said second amplifier as a third input to said comparator means.

2. A bidirectional waveform generator comprising:
first and second voltage sources,
electrical energy storage means,
switch means for energizing said storage means from said first or second voltage sources alternatively,
comparator means for comparing the energy stored in said storage means with that one of said voltage sources from which the storage means is energized at a given instant,
means responsive to said comparator means for operating said switch means,
whereby said switch means is cyclically operated between said first and second voltage sources and said storage means is cyclically energized from said voltage sources in alternation,
modulating means for varying at least one of said storage or comparator means to vary duration of the period of said cyclic switch operation,
said storage means comprising
an amplifier,
a first impedance connected between an input of the amplifier and said switch means, and
a second impedance connected between the output of said amplifier and said input thereof,
said comparator means comprising a network of impedances including impedances connected to the output of said amplifier and to the output of said switch means,
said modulating means comprising
a second switch means having a second switch output connected to provide additional input to said comparator means and operable to connect said second switch output to first and second points of input potential, the values of which represent information to be modulated upon the waveform of said apparatus, and
means for operating said second switch means in synchronism with said first switch means.

3. The apparatus of claim 2 including a bridge circuit having at least one leg thereof adapted to vary in accordance with a condition to be sensed, said bridge circuit having first and second energizing terminals connected to said first and second voltage sources, respectively, and having first and second bridge output terminals, said first and second bridge output terminals being connected to said first and second points of input potential.

4. The apparatus of claim 3 including a high gain operational amplifier connected between the output of said second switch and an input of said comparator means.

5. A bidirectional waveform generator comprising:
a first amplifier having an output and an input,
a first impedance connected with said input,
first and second reference voltage sources,
switch means having an output, and first and second inputs connected to said voltage sources, respectively, said switch means adapted to be operated between first and second states wherein it feeds a current through said first impedance to said amplifier input from said first and second switch means inputs,
a second impedance connected between said amplifier input and output,
at least one of said impedances being a reactive impedance, comparator means responsive to said amplifier output and to said switch means output for providing a trigger signal when said amplifier output attains a predetermined relation with respect to said switch means output, and
means responsive to said trigger signal for operating said switch means from one of said states to the other of said states, whereby when said switch means is in said one state, current is fed to the amplifier input through said first impedance from said first switch means input and from said first voltage source to cause said amplifier output to vary until it reaches a predetermined relation with respect to said switch means output,
and whereby when said predetermined relation is reached, said switch means is operated to the second state thereof to feed a current to said amplifier input through said first impedance from the second switch means input and from the second voltage source, to provide a continuously fluctuating bidirectional output signal from at least one of said amplifier and switch means outputs,
modulating means responsive to an information signal for varying the period of said bidirectional fluctuating signal, said comparator means having a third input, and
said modulating means comprising means responsive to said information signal for providing a modulating signal to the third input of said comparator.

6. The apparatus of claim 5 wherein said first and second voltage sources are of mutually equal magnitude but opposite polarity, and wherein means are provided to switch polarity of said modulating signal in synchronism with operation of said switch means.

7. A bidirectional waveform generating circuit comprising:
a first amplifier having an input and an output,
a first resistor having one side thereof connected to said amplifier input,
a capacitor connected between said amplifier input and output,
a second resistor having one side connected to said amplifier output,
a third resistor having one side connected to the other side of said first resistor and having the other side thereof connected to the other side of said second resistor,
a comparator amplifier having an input connected to the junction between said second and third resistors and having an output,
a first source of positive potential,
a second source of negative potential,
a first switching transistor connected between said source of positive potential and said other side of said first resistor,
a second switching transistor connected between said source of negative potential and said other side of said first resistor, said first and second switching transistors having controlling inputs connected to the bases thereof, and
switch driving means connected between the output of said comparator amplifier and said controlling inputs of said switching transistors to effect mutually exclusive operation of said switching transistors in response to a given output of said comparator amplifier.

8. The apparatus of claim 7 wherein said switching transistors are of opposite polarity types having output electrodes connected together and to said other side of said first resistor and having input electrodes connected to said positive and negative voltage sources respectively, whereby a first output signal from said comparator amplifier output saturates said first switching transistor and cuts off said second transistor and a second output from said comparator amplifier saturates said second transistor and cuts off said first transistor.

9. The apparatus of claim 7 including a fourth resistor having one side thereof connected to the junction of said second and third resistors and the other side thereof adapted to receive an input signal to be modulated upon the output waveform of said apparatus.

10. The apparatus of claim 9 including a modulating amplifier having an output connected to the other side of said fourth resistor and having an input connected to be switched in synchronism with the switching operation of said first and second switching transistors, and means responsive to information to be modulated upon the output waveform of said apparatus for modifying the gain of said modulating amplifier.

11. The apparatus of claim 7 including a fourth resistor having one side connected to the junction of said second and third resistors, a modulating amplifier having an output connected to the other side of the fourth resistor and having an input, a second switching circuit having an output connected to the input of said modulating amplifier and having first and second input terminals adapted to receive an information signal to be modulated upon the output waveform of said apparatus, and means responsive to the output of said comparator amplifier for operating said second switching device in synchronism with said first and second switching transistors.

12. The apparatus of claim 11 including a bridge circuit adapted to sense a condition to be modulated upon the output signal of said apparatus, means for energizing said bridged circuit from said first and second voltage sources respectively, said bridge circuit having first and second output terminals connected to said first and second input terminals of said second switching device.

* * * * *